United States Patent [19]

Reed

[11] Patent Number: 4,551,872
[45] Date of Patent: Nov. 12, 1985

[54] ORTHOPEDIC TRACTION FRAME

[75] Inventor: Albert D. Reed, Greenwood, S.C.

[73] Assignee: Professional Medical Products, Inc., Greenwood, S.C.

[21] Appl. No.: 577,563

[22] Filed: Feb. 6, 1984

[51] Int. Cl.$^4$ .......................... A61H 1/02; F16M 13/00
[52] U.S. Cl. .......................................... 5/445; 248/159; 128/77; 128/25 R; 403/234; 403/358
[58] Field of Search .......................... 5/445, 508, 503; 248/407, 354.5, 159; 403/108, 379, 87, 84, 88, 117, 104, 234, 236, 358; 128/25 R, 25 B, 26, 77

[56] References Cited

U.S. PATENT DOCUMENTS 3,612,042 10/1971 Fry ...................................... 128/25 R

Primary Examiner—Kenneth J. Dorner
Assistant Examiner—Vinh Luong
Attorney, Agent, or Firm—Luke J. Wilburn, Jr.

[57] ABSTRACT

An orthopedic traction frame for an adjustable hospital bed having relatively movable head and foot portions to adjustably position the mattress of the bed, the frame comprising of a pair of upright elongate support members for attachment to the headboard and footboard portions of the bed respectively, and a horizontal elongate support member interconnecting the upper ends of the same. The lower end of the upright member at the foot of the bed is pivotally attached to the footboard of the bed for movement about an axis perpendicular to the longitudinal axis of the bed, and adjustable clamping device is provided for attaching the upper end of the upright member at the foot of the bed to the end of the horizontal support member for pivotal movement of the upper end about an axis perpendicular to the longitudinal axis of the bed, whereby the foot of the bed may be retractably positioned and the traction frame adjusted for optimum load support at all positions of adjustment of the bed and mattress.

4 Claims, 3 Drawing Figures 4,551,872

ORTHOPEDIC TRACTION FRAME

The present invention relates to an orthopedic traction frame for a hospital bed, and, more particularly, to an improved orthopedic traction frame for attachment to an adjustable hospital bed having a retractable foot portion, to be used to support orthopedic equipment and facilitate movement and support of a patient in the hospital bed.

BACKGROUND OF THE INVENTION

It is known to provide overhead support framing for hospital beds to assist in the treatment and movement of bed patients. Such framing is variously constructed and generally includes upright support members suitably attached to the head and foot of the bed and interconnected by one or more horizontal members. The horizontal members extend the length of the bed in spaced relation above the mattress and patient at a height to support various orthopedic equipment, such as a hand trapeze, pulleys, weights, and interconnecting support lines.

It is also known to specifically provide an orthopedic traction frame for adjustable hospital beds in which the foot portion of the bed moves toward and away from the head portion of the bed to angularly position portions of the mattress. One such traction frame comprises a pair of upright support members, or bars, respectively attached to the head and foot portions of the bed and interconnected at their upper ends by a generally horizontal support member, or bar, to which orthopedic equipment may be attached. To allow movement of the foot portion of the bed toward and away from the head for angular positioning of the mattress, the end of the upper horizontal support member is equipped with a special hinge for pivotal attachment of the horizontal member to the upper end of the upright support member at the foot of the bed. Specifically, the end of the horizontal member is provided with a short rod element pivotally attached in a longitudinal slot in the end portion of the nember. The end of the rod element is received into the upper end of the upright member at the foot of the bed to provide pivotal interconnection of the two members. The upright support member at the foot of the bed is in turn pivotally attached to a horizontal T-bar mounted on the foot of the bed. In this manner, the upright member is free to pivot at both of its ends about axes transverse to the length of the bed to allow the foot of the bed to move toward or away from the head of the bed and angularly position portions of the mattress and bed patient.

With such adjustable traction framing as described, the upright support member at the foot of the bed will generally be disposed in a non-vertical position, which reduces the load bearing capacity of the traction frame. In addition, since the horizontal member is equipped with a special hinge for use with adjustable hospital beds, it is a special framing component which must be stocked apart from use in other traction framing constructions.

BRIEF OBJECTS OF THE PRESENT INVENTION

It is an object of the present invention to provide an improved adjustable orthopedic traction frame for use with retractable hospital beds having relatively movable head and foot portions.

It is another object to provide an improved orthopedic traction frame for attachment to an adjustable hospital bed wherein the upright and horizontal support members above the foot of the bed maybe adjustably interconnected for pivotal movement to provide optimum load bearing capacity for the frame at all positions in which the mattress of the bed may be positioned for use.

It is a more specific object to provide an improved orthopedic traction frame for an adjustable hospital bed wherein the upright support member at the foot of the bed is pivotably attached for adjustable positioning along the length of a standard elongate horizontal support member which is suitable for use in various other traction frame constructions.

SUMMARY OF THE INVENTION

The present invention is an improved orthopedic traction frame for adjustable hospital beds having relatively movable head and foot portions comprising a pair of upright support members for respective attachment to the head and foot portions of the bed and interconnected at their upper ends to a standard elongate support member. The upper end of the upright support member at the foot of the bed is provided with clamp means having a base portion received in the upper end of the upright member, and a clamping portion pivotally connected thereto for removable attachment to the upper horizontal member at any position along its length, thus providing means for vertically disposing the upright member when the bed is in various positions of use. Such vertical disposition of the upright member provides optimum load-bearing capabilities for the frame in use.

BRIEF DESCRIPTION OF THE DRAWINGS

The above as well as other objects of the present invention will become more apparent, and the invention will be better understood, from the following detailed description of a preferred embodiment thereof, when taken together with the accompaning drawings, in which.

DETAILED DESCRIPTION OF PREFERRED EMBODIMENTS

Figure 1:
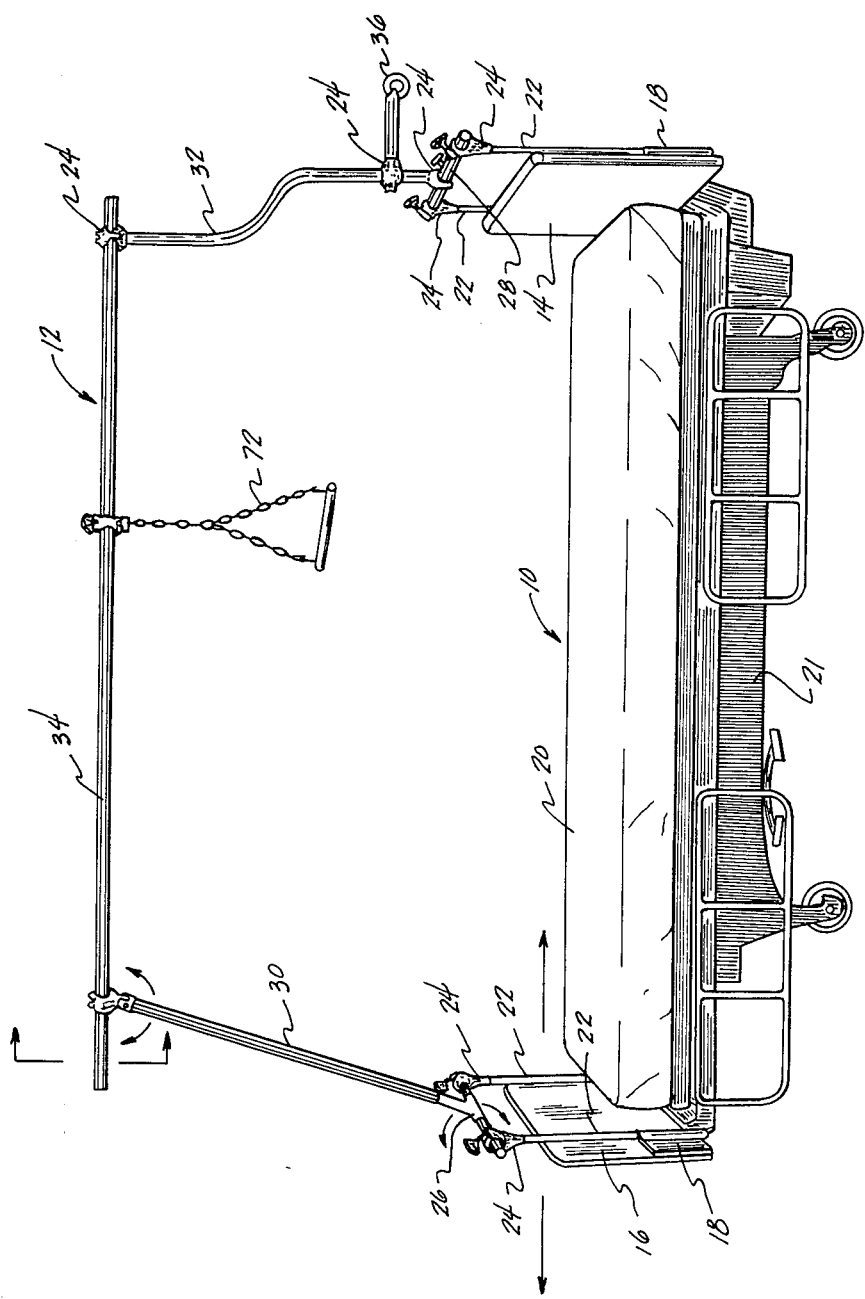
FIG. 1 is a perspective side view of an adjustable hospital bed provided with the improved orthopedic traction frame of the present invention.

Referring more specifically to the drawings, FIG. 1 is a perspective side view of an adjustable hospital bed 10 to which an orthopedic traction frmme 12 of the present invention is attached. The bed includes a vertical headboard 14 and footboard 16. Mounted adjacent the sides and on the rear faces of the headboard and footboard are four tubular supports, two of which, 18, can be seen in FIG. 1. Such tubular supports 18 normally are employed to telescopically receive and support the end of an upright elongate rod (not shown) used to support a liquid container for administering intravenous solutions to a bed patient.

The mattress 20 of the bed is adjustably positionable at selected elevations and angles of use. For this purpose, the base portion 21 of bed 10 is equipped, in conventional manner (not shown), with support framing, levers, and motor means for retracting the footboard 16 of the bed toward the headboard 14, thereby shortening the horizontal distance between the head and footboards and elevating portions of the mattress at selected angles for the comfort of the patient. Such adjustable hospital beds are well known, and one such bed, as shown, is manufactured under the name "Hill-Rom" Retractable Bed by Hillenbrand Industries of Batesville, Ind.

As seen in FIG. 1, the traction support frame 12 is attached to the bed by four vertical rods 22, the lower ends of each which are telescopically received in a respective one of the four I.V. tubular supports 18 attached to the head and footboards. Attached to the upper end of each rod 22 is a clamp 24 which supports the ends of horizontal frame members 26, 28. As seen, members 28, 26 are located just above and extend generally parallel to the upper edges of the head and footboards, respectively. Clamps 24 are of conventional construction made by All Orthopedic Appliance Division of Professional Medical Products, Inc. under the trademark "Chick". Each clamp 24 has a pair of hinged pivotable jaws which surround the circumference of the horizontal support members 26, 28 and are secured thereabout by a pivotable, threadably adjustable knob, details of which are not shown.

Attached to the frame members 26, 28 at the central longitudinal axis of the bed are a pair of upstanding frame members 30, 32. Members 30, 32 in turn support the ends of an elongate horizontal support member or bar 34 which interconnects their upper ends. As seen in FIG. 1, both ends of upright member 32 at the head of the bed are provided with a "Chick" clamp 24 to secure member 32 to the horizontal members 28, 34. A short standoff rod with roller 36 is attached to member 32 by a clamp 24 to space the head of bed 10 from the wall of a room in which it is used. Upright member 32 is curved inwardly at its upper end portion to accommodate the space requirements of a conventional light console mounted on the wall of the hospital room.

Support members 26, 28, 30, 32, and 34 of the traction frame 12 conveniently may be manufactured of lightweight, high strength extruded aluminum tubing of octagonal cross-section, or of other suitable material of sufficient strength to support various orthopedic equipment and the weight of a patient during use.

Figure 3:
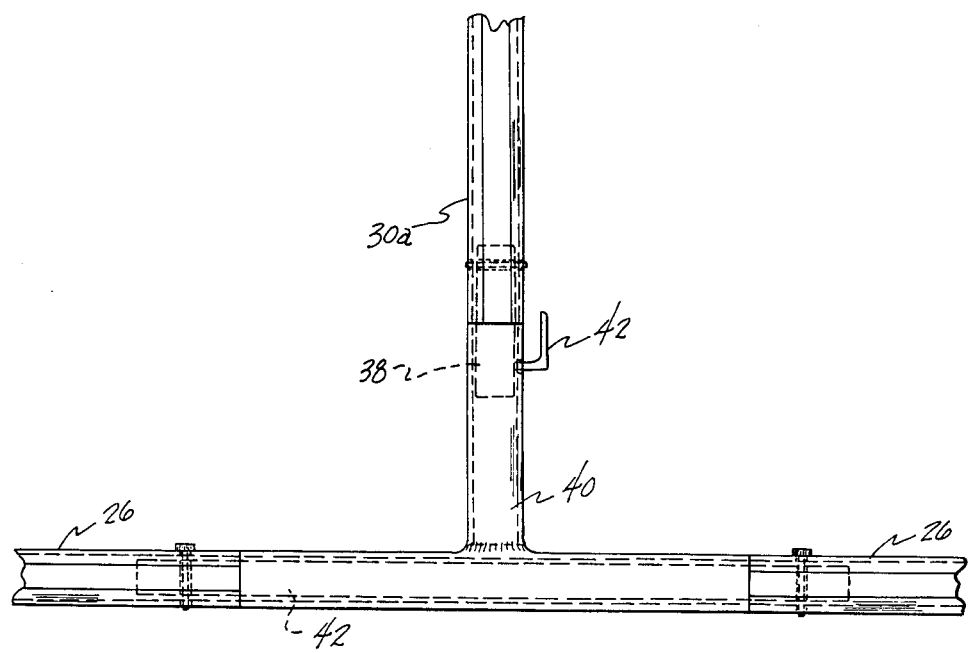
FIG. 3 is an enlarged end elevation view of the lower portion of the upright support member at the foot of the bed, as shown in FIG. 1, showing its pivotal attachment to foot of the bed.

As best seen in FIG. 3, attached to the lower end 30a of upright member 30 at the foot of the bed is a stub shaft 38 of reduced diameter which is telescopically received within the upper end of a T-shaped sleeve 40. Sleeve 40 surrounds a smaller diameter central rod 42 of horizontal member 26 so that it is pivotally movable about the longitudinal axis of member 24. The lower end of upright member 30 thus is supported for pivotal movement about an axis perpendicular to the longitudinal axis of the bed. The upper end of sleeve 40 has a threaded locking member 42 which engages stub shaft 38 to secure member 30 to the sleeve 40.

Figure 2:
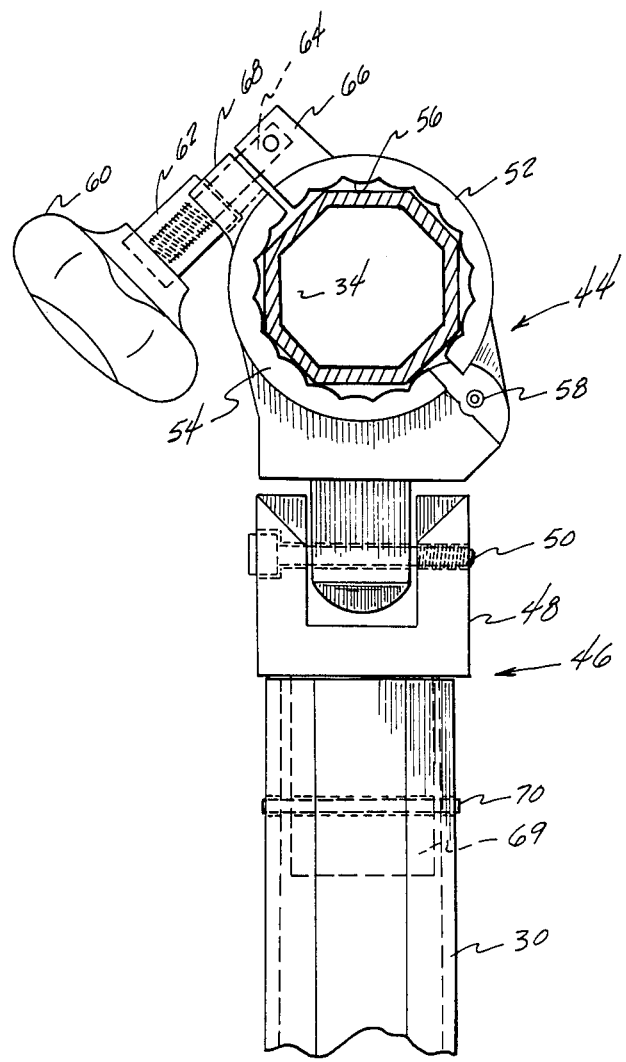
FIG. 2 is an enlarged sectional end elevation view of the upper left end portion of the traction frame of FIG. 1, looking in direction of arrows II—II, and showing the interconnection of the upper end of the upright support member at the foot of the bed to the upper horizontal support member of the frame.

FIG. 2 is an enlarged sectional end elevation view taken generally along line II—II of FIG. 1 and looking in the direction of the arrows. FIG. 2 shows the specific manner of attachment of the upper end of upright support member 30 to the horizontal support member or bar 34 which comprises the improved orthopedic traction frame of the present invention. Member 30 and member 34 are pivotally interconnected by clamp means comprising an upper clamping portion 44 and a base portion 46 pivotally interconnected by a yoke 48 and pivot pin 50. Clamping portion 44 has a pair of hinged jaw elements 52, 54 with serrated inner surfaces 56 to grippingly engaging horizontal member 34. Jaws 52, 54 are pivotally connected on one side by a pin 58 and are held in clamping relation about the horizontal member 34 by a fastening knob 60. Knob 60 has an internally threaded shaft 62 threadably received on the end of a short rod 64 which is pivotally attached to an ear portion 66 of one jaw element and is received in a slot of an ear portion 68 of the other jaw element. The fastening knob is thus rotated to tighten the two jaws together around horizontal member 34. Such a clamping portion 44 is of the same construction found in the aforementioned "Chick" clamps of the prior art.

Base portion 46 of the clamp means includes a stub shaft 69 which is received into the open upper end of the upright tubular support member 30 and fixed thereto by a friction pin 70 which passes through aligned openings of the tubular member 30 and a passageway through the stub shaft. The yoke 48 is attached by pivot pin 50 to the clamping portion 44, and the clamp means is positioned on the end of the upright member 30 for pivotal movement about an axis perpendicular to the longitudinal axis of the bed, thus allowing the upright member 30 to pivot at its two ends about parallel axes perpendicular to the longitudinal axis of the bed as the foot is retracted.

Various orthopedic equipment may be attached to the horizontal support member 34 of the traction frame. As seen in FIG. 1, a trapeze swing 72 illustrates one such orthopedic attachment.

In operation, when it is desired to elevate portions of the mattress of the bed, the foot of the bed is retracted toward the headboard 14 of the bed. Upright support member 30 pivots about its ends to allow movement of the footboard 16 without damage to the traction frame 12. When the mattress is positioned at the desired angle or elevation for use, the clamping portion 44 of the clamp means may be loosened and slid along the horizontal support member 34 to dispose the upright support member 30 vertically. The clamping means is then tightened about the horizontal support member 34 to provide optimum load support for the frame.

The removable attachment of the interconnecting clamp means to the horizontal support member 34 also permits member 34 to be a plain bar, conventional support member, useful in other traction frame constructions, since it is free of any special hinge features heretofore employed for use in adjustable orthopedic bed framing.

That which is claimed is:

1. In an orthopedic traction frame for an adjustable hospital bed having relatively movable head and foot portions, said frame including a pair of elongate upright support members for attachment to the head and foot portions of the bed, respectively, a generally horizontal support member attached to and interconnecting the upper ends of the upright members for supporting orthopedic equipment thereon, and means for attaching the opposite ends of the upright member at the foot of the bed to the foot of the bed and to the horizontal support member, respectively, for pivotal movement of the ends about respective axes extending perpendicular to the length of the bed to permit variable positioning of the head and foot of the bed toward and away from each other; the improvement wherein said attaching means includes adjustable clamp means for pivotal attachment of the upper end of the upright member at the foot of the bed to the horizontal member, said clamp means including a releasable clamping portion for surroundingly engaging the horizontal member to permit its adjustable positioning along the length of the horizontal member, a base portion for fixed attachment to the upper end of the upright member at the foot of the bed, and means pivotally interconnecting the clamp portion and the base portion for relative movement of the same about an axis perpendicular to the length of the bed to permit relative movement of the head and foot portions of the bed and adjustable positioning of the clamp means along the length of the horizontal member to optimize strength and load support by the frame in various positions of the head and foot of the bed.

2. A frame as defined in claim 1 wherein the horizontal member comprises an elongate bar having a generally unobstructed exterior surface for securement of said clamp means at various positions therealong.

3. A frame as defined in claim 1 wherein said clamping portion of the clamp means comprises a pair of generally semi-circular clamping jaws pivotally connected at one end to each other, and adjustable fastening means for securing the other ends of the jaws together about the periphery of the horizontal support member of the frame.

4. A frame as defined in claim 1 wherein said base portion of the clamp means includes a stub member receivable in an open end of the upright member at the foot of the bed for fixed positional attachment of the clamp means to the upper end of the upright member.

* * * * *